(12) United States Patent
Saito et al.

(10) Patent No.: US 7,556,580 B2
(45) Date of Patent: Jul. 7, 2009

(54) MOTOR-DRIVEN WHEEL DRIVING APPARATUS

(75) Inventors: Tsuyoshi Saito, Iwata (JP); Kenichi Iwamoto, Iwata (JP)

(73) Assignee: NTN Corporation (JP)

( * ) Notice: Subject to any disclaimer, the term of this patent is extended or adjusted under 35 U.S.C. 154(b) by 339 days.

(21) Appl. No.: 10/590,240

(22) PCT Filed: Jan. 17, 2005

(86) PCT No.: PCT/JP2005/000454

§ 371 (c)(1),
(2), (4) Date: Sep. 25, 2006

(87) PCT Pub. No.: WO2005/080113

PCT Pub. Date: Sep. 1, 2005

(65) Prior Publication Data

US 2007/0181357 A1    Aug. 9, 2007

(30) Foreign Application Priority Data

Feb. 23, 2004   (JP) .............................. 2004-045615

(51) Int. Cl.
*F16H 48/06* (2006.01)
(52) U.S. Cl. ...................... 475/154; 475/149; 180/65.5
(58) Field of Classification Search ...................... 475/5, 475/149, 154; 180/65.5, 371, 372
See application file for complete search history.

(56) References Cited

U.S. PATENT DOCUMENTS

| | | | | |
|---|---|---|---|---|
| 4,402,374 A | * | 9/1983 | Knur et al. ................. | 180/65.7 |
| 5,127,485 A | * | 7/1992 | Wakuta et al. ............. | 180/65.5 |
| 5,382,854 A | * | 1/1995 | Kawamoto et al. ........ | 310/67 R |
| 6,037,766 A | * | 3/2000 | Goossens et al. ........... | 324/173 |
| 6,209,389 B1 | * | 4/2001 | Sakamoto et al. ........ | 73/115.08 |
| 6,406,186 B1 | * | 6/2002 | Torii et al. .................. | 384/448 |
| 2003/0189388 A1 | | 10/2003 | Hashimoto et al. | |

FOREIGN PATENT DOCUMENTS

| | | |
|---|---|---|
| JP | 05-278476 A | 10/1993 |
| JP | 07-081436 A | 3/1995 |
| JP | 2001-032888 A | 2/2001 |
| JP | 2001-032914 A | 2/2001 |

(Continued)

*Primary Examiner*—David D. Le
(74) *Attorney, Agent, or Firm*—Harness, Dickey & Pierce, P.L.C.

(57) ABSTRACT

A motor-driven wheel driving apparatus has a wheel bearing, a planetary reduction gear, a driving section with an electric motor to drive the planetary reduction gear, and a rotation member. The wheel bearing includes a wheel hub, an inner ring, an outer member and double row rolling elements arranged between the inner and outer raceway surfaces. The planetary reduction gear includes an input element, a stationary element, a plurality of planetary, and an output element to rotatably support the planetary elements relative to a connecting shaft. The driving section forming the electric motor has a stator housing, a stator portion contained within the stator housing, and a rotor portion secured on the rotation member arranged opposite to the stator portion via a predetermined air gap. The connecting shaft is removably and torque-transmittably connected to the wheel hub. The connecting shaft is adapted to drive the wheel by transmitting the rotation of the electric motor to the wheel hub via the planetary reduction gear.

9 Claims, 8 Drawing Sheets

FOREIGN PATENT DOCUMENTS

| | | | |
|---|---|---|---|
| JP | 2001-173762 A | 6/2001 |
| JP | 2001-315534 A | 11/2001 |
| JP | 3366625 B2 | 11/2002 |
| JP | 2004-52787 A | 2/2004 |
| JP | 2004-114858 A | 4/2004 |
| JP | 2005-081871 A | 3/2005 |

* cited by examiner

MOTOR-DRIVEN WHEEL DRIVING APPARATUS

CROSS-REFERENCE TO RELATED APPLICATIONS

This application is a National Stage of International Application No. PCT/JP2005/000454, filed Jan. 17, 2005, which claims priority to Japanese Patent Application No. 2004-045615, filed Feb. 23, 2004. The disclosures of the above applications are incorporated herein by reference

FIELD

The present disclosure relates to a motor-driven wheel driving apparatus with a combined wheel bearing and electric motor used in a vehicle, such as an electric vehicle, a golf cart or a fork lift truck.

BACKGROUND

Motor-driven wheel driving apparatus has been proposed to improve driving efficiency in the case of driving a wheel by an electric motor, such as for driving a wheel, e.g. of an electric car where the wheel is directly driven by the electric motor. However, since such a motor-driven wheel driving apparatus requires a large torque in the electric motor, it is necessary to use a large motor with high power. This increases not only the manufacturing cost but the weight of vehicle and accordingly, makes it difficult to ensure sufficient driving performance.

On the other hand, motor-driven wheel driving apparatus (wheel motor) equipped with a reduction gear have been proposed where an electric motor and a planetary reduction gear are arranged within a space inside a wheel. The rotational output of the electric motor is transmitted to the wheel via the planetary reduction gear.

When adopting the planetary reduction gear as a reduction gear, its output shaft to transmit the rotational output of the electric motor to the wheel, via the planetary reduction gear, has to take out its output while coinciding its axial center to that of the motor shaft after once having been divided in the axial direction of the motor-driven wheel driving apparatus. Accordingly, problems are caused in such an apparatus where its structure is difficult to assemble and the strength against inclination of the wheels during running of vehicle is low because of the adoption of a small supporting span of the output shaft.

In order to solve these problems, a known motor-driven wheel driving apparatus is shown in FIG. 8. The motor-driven wheel driving apparatus 51 has an electric motor 54 and reduction gear 55 within the inside of a wheel 53 mounted with a tire 52. The wheel 53 can be driven by the rotational output of the electric motor 54.

The electric motor 54 comprises a stator 57 secured to a side of a case 56 arranged inside the wheel 53. A rotor 58 is arranged opposite to the stator 57. An output shaft 59 is mounted to the rotor 58 to transmit the rotational torque of the rotor 58 to the wheel 53, via the reduction gear 55. The stator 57 and the rotor 58 are secured to a side of the case 56 which is sandwiched by covers 60 and 61 to form the electric motor 54.

One end 59a of the output shaft 59 is integrally formed with a mounting flange 62 which is secured to the wheel 53 via hub bolts 63. This end 59a of the output shaft 59 is rotatably supported by a rolling bearing 64 positioned within a shaft insert aperture 56b in the case 56. The other end of the shaft 59b is also rotatably supported by a rolling bearing 65 positioned within a central recess 60a of the outer cover 60.

The reduction gear 55, contained within the case 56, is formed by a plurality of gears 55a, 55b, 55c and 55d. A first gear 55a is integrally formed with and coaxially arranged at the end of the rotor 58. Second and third gears 55b and 55c are secured on the same supporting shaft 66 and thus rotate simultaneously. The second gear 55b and the first gear 55a mesh with each other. One end 66a of the supporting shaft 66 is rotatably supported by a rolling bearing 67 within a recess 61a of the inner cover 61. Its other end 66b is also rotatably supported by a rolling bearing 68 within a recess 56a of the case 56. The force gear 55d is secured on the output shaft 59 and meshes with the third gear 55c.

According to such a structure, the output shaft 59 of the electric motor 54 is rotatably supported at opposite ends of the case 56. The output shaft 59 is passed through the aperture of the center of rotation of the fourth gear 55d which is the final stage of the reduction gear 55. Also, the output shaft 59 is passed through the shaft inserting aperture 58a of the rotor 58. Thus, the apparatus can be easily assembled by sequentially fitting the structural parts of the reduction gear 55, the inner cover 61, the structural parts of the electric motor 54, and the outer cover 60 onto the output shaft 59 using it as a reference part. In addition, since the output shaft 59 is supported at substantially opposite ends of the motor-driven wheel driving apparatus 51, it is possible to ensure the supporting span of the output shaft 59. Thus, this obtains a sufficient supporting strength against the inclination of the wheel during running of vehicle (see Japanese Laid-open Patent Publication No. 81436/1995).

In such a motor-driven wheel driving apparatus, while the reduction gear 55 can easily assemble various structural parts, the installation space for the rolling bearings 64 and 65 to support the output shaft 59 is limited since the electric motor 54 requires a large mounting space due to its high rotational output. Accordingly, the loading capacity against the inclination of the wheel 53 during running of the vehicle, against the moment load, becomes insufficient, and thus it requires improvement to the durability of the rolling bearings 64 and 65.

SUMMARY

It is an object of the present disclosure to provide a motor-driven wheel driving apparatus which can solve the problems of the prior art. The present apparatus improves the durability of the wheel bearing, reduces the weight and size of the apparatus, and make it easy to assemble and disassemble the apparatus.

According to the present disclosure, a motor-driven wheel driving apparatus comprises a wheel bearing, a planetary reduction gear, a driving section with an electric motor to drive the planetary reduction gear, and a rotation member. The wheel bearing includes a wheel hub formed with a wheel mounting flange on its one end. An inner ring is press-fit onto a cylindrical portion of the wheel hub. The inner ring is formed with at least one double row inner raceway surfaces on its outer circumferential surface. An outer member is formed with double row outer raceway surfaces on its inner circumferential surface opposite to the inner raceway surfaces. Double row rolling elements are rollably arranged between the inner and outer raceway surfaces. The planetary reduction gear includes an input element mounted on the rotation member; a stationary element mounted on the inner circumferential surface of the outer member; a plurality of planetary elements arranged between the stationary element and the input element; and an output element supporting the planetary elements rotatably relative to a connecting shaft. The driving section, forming the electric motor, has a stator housing mounted on the outer member. A stator portion is contained within the stator housing. A rotor portion is secured on the rotation member and arranged opposite to the stator portion via a predetermined air gap. The connecting shaft is removably and torque-transmittably connected to the wheel hub and adapted to drive the wheel by transmitting the rotation of the electric motor to the wheel hub via the planetary reduction gear.

The adoption of this structure makes it possible to sufficiently ensure the necessary space for the bearing section. In addition, since the connecting shaft, forming the planetary reduction gear, is removably and torque transmittably connected to the wheel hub, it is possible to replace the wheel bearing, the planetary reduction gear and the driving section by easily separating them from each other when carrying out maintenance. Thus, it is unnecessary to replace the whole apparatus and thus it is possible to reduce resource as well as maintenance cost.

The planetary reduction gear comprises a sun gear mounted on the rotation member. A plurality of planetary gears mesh both with external teeth of the sun gear and with internal teeth formed on the inner circumferential surface of the outer member. A carrier pin projects from the outer circumferential portion of the connecting shaft to rotatably support the planetary gears. Thus, it is possible to efficiently achieve power transmission without any sliding contact and to carry out lubrication by using grease sealed within the bearings. In addition, it is possible to suppress the application of offset load caused by the moment load to the planetary gears and the sun gear. Also, it is possible to suppress the generation of meshing noise caused by the meshing between the planetary gears and the sun gear.

A braking apparatus is integrally mounted on the rotation member to reduce cost by using common parts. In addition, since the braking action can be obtained before speed reduction at the planetary reduction gears, it is possible to provide a light weight and compact size braking apparatus due to reduction of the braking torque.

Preferably, the braking apparatus is a parking brake. Such a structure makes it possible to use common parts and to arrange the parking brake, previously arranged at the outboard side, at the inboard side. Thus, this improves layout freedom to keep a space around the wheel bearing.

The parking brake comprises an intermediate member held on the stator housing. An actuator engages and disengages the intermediate member with the rotation member by displacing the intermediate member. This makes it possible to integrally connect the parking brake to the driving section. Thus, this further improves the layout freedom to keep a space around the wheel bearing.

A plurality of recesses is formed on the rotation member. The stator housing is formed with a plurality of through apertures corresponding to the recesses. The intermediate member has tapered surfaces contained in each of the through passage. The intermediate member can be adapted to engage and disengage with the recess while being displaced by a cylindrical member engaging the tapered surface. Also, a plurality of recesses and tapered surfaces are formed on the rotation member. The intermediate member is formed with projecting portions and tapered surfaces adapted to engage, respectively, with the recesses and tapered surfaces of the rotation member. The intermediate member is held so as to be able to transmit a torque to the stator housing and also to be axially displaced. Such a structure, engagement of the intermediate member with the recess of the stator housing, makes it possible to assure a larger braking force than the prior art parking brakes using a frictional force. Thus, this enables the apparatus to have a smaller weight and size.

The planetary reduction gear has first and second planetary reduction gears connected to each other via a connecting shaft. The power of the electric motor can be adapted to be transmitted to the wheel hub to reduce the rotation of the electric motor to two steps, via the first and second planetary reduction gears. This structure makes it possible to obtain a very large reduction ratio in a small space and thus to use an electric motor having smaller size and lighter weight.

The first planetary reduction gear comprises a sun gear mounted on the stator housing. A plurality of planetary gears mesh with both external teeth of the sun gear and with internal teeth formed on the inner circumferential surface of the rotation member. A carrier pin rotatably supports the planetary gears relative to a first connecting shaft. The second planetary reduction gear comprises a sun gear mounted on the first connecting shaft. A plurality of planetary gears mesh with both external teeth of the sun gear and with internal teeth formed on the inner circumferential surface of the outer member. A carrier pin rotatably supports the planetary gears relative to a second connecting shaft. The second connecting shaft is connected to the wheel hub. This structure makes it possible to assure the bearing space and thus to have a larger reduction ratio in a small space.

The stator housing is separably fastened to the outer member. Thus it is possible to replace a part (or parts) by easily separating the wheel bearing and the driving section during maintenance. This reduces resources and maintenance cost.

The present motor-driven wheel driving apparatus comprises a wheel bearing, a planetary reduction gear, a driving section with an electric motor to drive the planetary reduction gear, and a rotation member. The wheel bearing includes a wheel hub formed with a wheel mounting flange on one end. An inner ring is press-fit on a cylindrical portion of the wheel hub. The inner rings are formed with at least one double row inner raceway surfaces on its outer circumferential surface. An outer member is formed with double row outer raceway surfaces on its inner circumferential surface opposite to the inner raceway surfaces. Double row rolling elements are rollably arranged between the inner and outer raceway surfaces. The planetary reduction gear includes an input element mounted on the rotation member, a stationary element mounted on the inner circumferential surface of the outer member, a plurality of planetary elements arranged between the stationary element and the input element, and an output element to support the planetary elements rotatably relative to a connecting shaft. The driving section, including the electric motor, has a stator housing mounted on the outer member, a stator portion contained within the stator housing and a rotor portion secured on the rotation member and arranged opposite to the stator portion via a predetermined air gap. The connecting shaft is removably and torque-transmittably connected to the wheel hub. The connecting shaft is adapted to drive the wheel by transmitting the rotation of the electric motor to the wheel hub via the planetary reduction gear. Thus, it is possible to assure a sufficient space for the bearing section, and to easily replace any parts by disassembling, during maintenance, the wheel bearings, the planetary reduction gear and the driving section. Accordingly, it is unnecessary to replace the whole apparatus. Thus, it is possible to reduce resources and maintenance cost.

The present motor-driven wheel driving apparatus comprises a wheel bearing, a planetary reduction gear, a driving section with an electric motor to drive the planetary reduction gear, and a rotation member. The wheel bearing includes a wheel hub formed with a wheel mounting flange on one end. An inner ring is press-fit onto a cylindrical portion of the wheel hub. The inner ring is formed with at least one double row inner raceway surfaces on its outer circumferential surface. An outer member is formed with double row outer raceway surfaces on its inner circumferential surface opposite to the inner raceway surfaces. Double row rolling elements are rollably arranged between the inner and outer raceway surfaces. The planetary reduction gear includes an input element mounted on the rotation member, a stationary element mounted on the inner circumferential surface of the outer member, a plurality of planetary elements arranged between the stationary element and the input element, and an output element to support the planetary elements rotatably relative to a connecting shaft. The driving section, forming the electric motor, has a stator housing mounted on the outer member, a stator portion contained within the stator housing, and a rotor portion secured on the rotation member and arranged opposite to the stator portion, via a predetermined air gap. The connecting shaft is connected to the wheel hub via a serration. The connecting shaft is adapted to drive the wheel by transmitting the rotation of the electric motor to the wheel hub via the planetary reduction gear.

DRAWINGS

Additional advantages and features of the present invention will become apparent from the subsequent description and the appended claims, taken in conjunction with the accompanying drawings, wherein:

DESCRIPTION OF THE PREFERRED EMBODIMENTS

Preferred embodiments will be described with reference to accompanied drawings.

Figure 1:
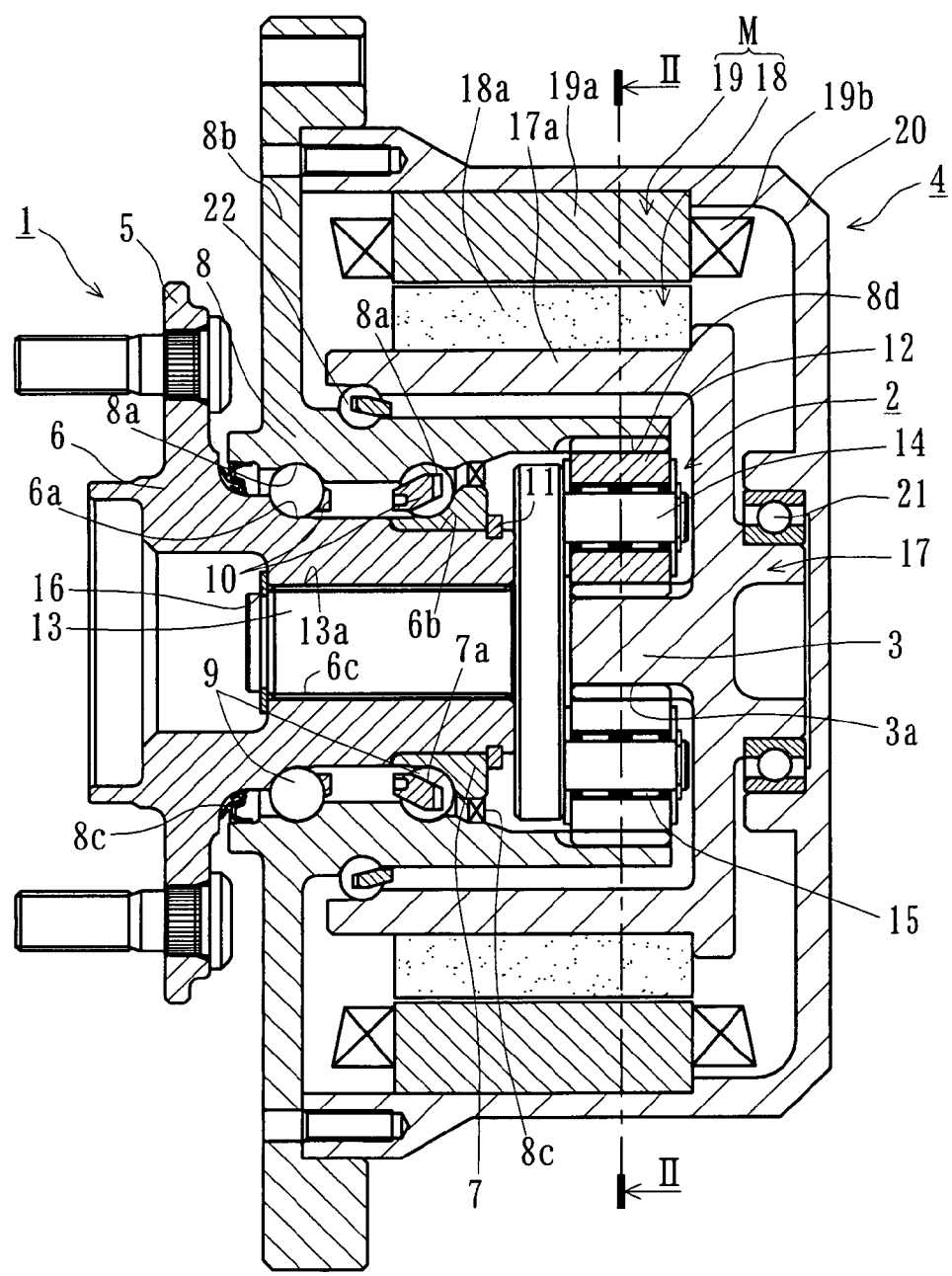
FIG. 1 is a longitudinal-section view of a first embodiment of a motor-driven wheel driving apparatus.
Figure 2:
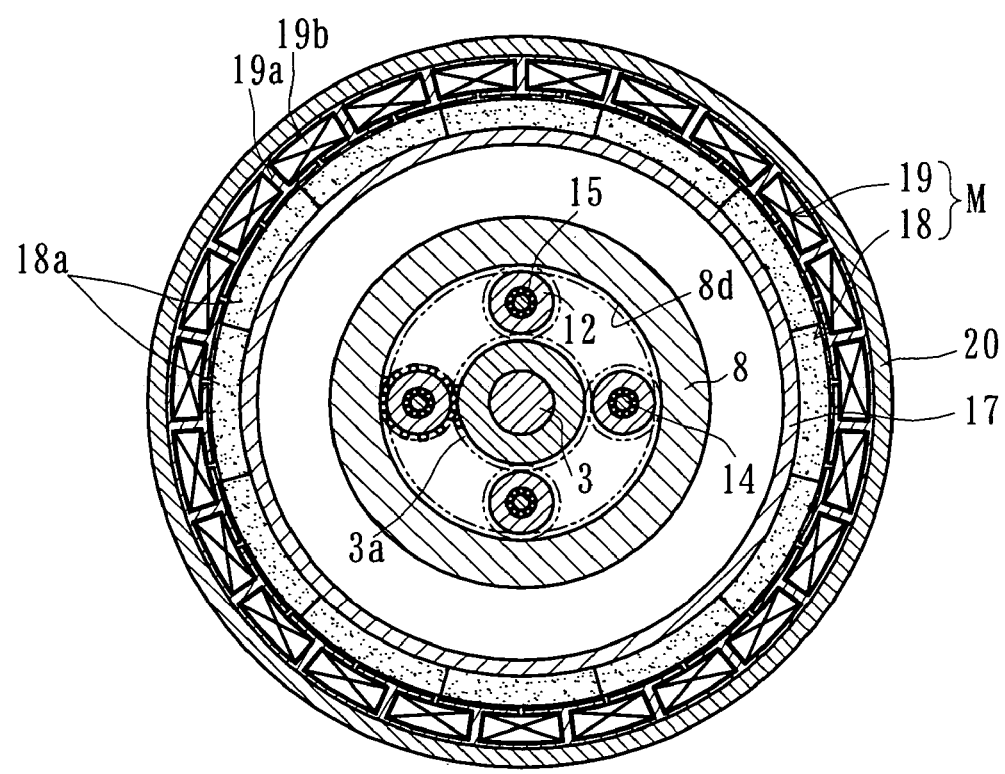
FIG. 2 is a cross-sectional view taken along a line II-II of FIG. 1.

FIG. 1 is a longitudinal-section view of a first embodiment of the present motor-driven wheel driving apparatus. FIG. 2 is a cross-sectional view taken along a line II-II of FIG. 1.

The wheel bearing 1 is a so-called "third generation" bearing used to support a driving wheel (not shown). The wheel bearing 1 comprises a wheel hub 6 integrally formed with a wheel mounting flange 5 at the outboard side end, an inner raceway surface 6a and a cylindrical portion 6b extending from the inner raceway surface 6a. An inner ring 7 is formed with an inner raceway surface 7a on its outer circumferential surface. The inner ring 7 is fit onto the cylindrical portion 6b of the wheel hub 6. An outer member (stationary element) 8 is integrally formed with a body mounting flange 8b on its outer circumferential surface. The mounting flange 8b is to be secured on a body of the vehicle. The outer member 8 is also integrally formed with double row outer raceway surfaces 8a and 8a on its inner circumferential surface. The outer raceway surfaces 8a and 8a are arranged opposite to the inner raceway surfaces 6a and 7a. Double row rolling elements (balls) 9 are rollably contained between the inner and outer raceway surfaces. A cage 10 holds the rolling elements 9 equidistantly around the inner raceway surfaces 6a and 7a. Seals 8c and 8c are arranged at either ends of the outer member 8 to prevent leakage of lubricating grease sealed within the bearing. Also, the seals 8c and 8c prevent the penetration of rain water or dusts from the external circumstances.

The outer circumferential surface of the wheel hub 6 is formed with a hardened layer having a surface hardness of 54~64 HRC at a seal land region at a base of the wheel mounting flange 5 as well as a region from the inner raceway surface 6a to the cylindrical portion 6b. The heat treatment is preferably carried out by high frequency induction quenching due to the ease of setting the depth of the hardened layer. A stop ring 11 is mounted at the end of the cylindrical portion 6b of the wheel hub 6 to prevent the inner ring 7, press-fit onto the cylindrical portion 6b, from being axially slipped off.

Although it is illustrated as a double row angular ball bearing using balls as rolling elements 9, a double row tapered roller bearing, using tapered rollers, may also be used. In addition, although a bearing of the third generation structure is shown, with the inner raceway surface 6a directly formed on the outer circumferential surface of the wheel hub 6, a so-called second generation structure, with a pair of inner rings press-fit onto the cylindrical portion of the wheel hub, could be used.

A planetary reduction gear 2 includes internal teeth 8d, formed on an inner circumferential surface, at the inboard end of the outer member (stationary element) 8 and 4. Planetary gears (planetary elements) 12 mesh with external teeth 3a of a sun gear (input element) 3. The planetary gears 12 are arranged between the sun gear 3 and the outer member 8. The planetary gears 12 are rotatably supported on carrier pins 14. The carrier pins 14 project from the circumferential portion of the connecting shaft 13 (see FIG. 2). The connecting shaft 13 includes a serration (or spline) 13a on its outer circumferential surface. The serration (or spline) 13a meshes with a serration (or spline) 6c formed on the inner circumferential surface of the wheel hub 6 in a torque transmittable manner. The wheel hub 6 and the connecting shaft 13 are axially detachably secured to each other by a stop ring 16 mounted on the end of the connecting shaft 13. Although the sun gear 3 is illustrated in this embodiment directly formed on the rotation member 17, forming the driving section 4, it is possible to form a separate sun gear adapted to be press-fit onto a rotation shaft projecting from the rotation member.

The rotation member 17 has a cup shape. A rotor portion 18, forming a part of an electric motor "M", is secured on the outer circumferential surface of a cylindrical portion 17a of the rotation member 17. The rotor portion 18 is comprised of a plurality of permanent magnets 18a. A stator portion 19 is arranged opposite to the rotor portion 18. A predetermined air gap is between the rotor portion 18 and stator portion 19. The stator portion 19 is contained within a stator housing 20 which has a cup shaped configuration. The stator portion 19 is comprised of a stator iron core 19a and a stator coil 19b wound on the stator iron core 19a. The electric motor "M" is formed by the rotor portion 18 and the stator portion 19 (see FIG. 2).

The rotation member 17 is rotatably supported relative to the stator housing 20 and the outer member 8, forming the stationary member, by rolling bearings 21 and 22. The stator housing 20 is detachably fastened to the body mounting flange 8b, by bolts (not shown), to the outer member 8. The rotation member 17 is rotated by supplying electric energy to the electric motor "M". The rotation of the rotation member 17 is transmitted to the planetary gears 12, via the sun gear 3. Finally, the rotation of the planetary gears 12 is transmitted to the wheel hub 6 to rotate a wheel (not shown).

The speed reduction ratio of the planetary reduction gear 2 can be appropriately adjusted by changing the ratio of the number of teeth of the planetary gear 12 and the number of teeth of the outer member 8. For example, a reduction ratio in a range of 3:1 to 9:1 can be set when the planetary reduction gear 2 is applied to the motor-driven wheel driving apparatus of an electric vehicle. In addition, if desiring to obtain such a level of reduction ratio, it can be sufficiently achieved by reducing the outer diameter of the sun gear 3 and thus the reduction gear is never enlarged when accompanied with an increase of the reduction ratio. Furthermore, a sufficient space for the bearing section can be assured due to the meshing of the planetary gears 12 with the internal teeth 8d formed on the inner circumferential surface of the outer member 8 in the wheel bearing apparatus 1. Also, the offset load to the planetary gears 12 and the sun gear 3 by the moment load can be suppressed. Furthermore, meshing noise caused by meshing between the planetary gears 12 and the sun gear 3 can be suppressed. In addition, since the connecting shaft 13 forming the planetary reduction gear 2 is connected to the wheel hub 6 via the serration 13a, it is possible to replace any part during maintenance by easily disassembling, as a sub unit, the wheel bearing 1, the planetary reduction gear 2, and the driving section 4. Thus, it is unnecessary to replace the whole apparatus and it is possible to reduce resources and maintenance cost.

Although it is shown in this embodiment that power is transmitted to each element of the planetary reduction gear by the gear transmitting mechanism, other power transmitting mechanism such as friction mechanism (e.g. traction drive) may be used. In this case, noise and vibration caused during power transmission can be largely reduced.

Figure 3:
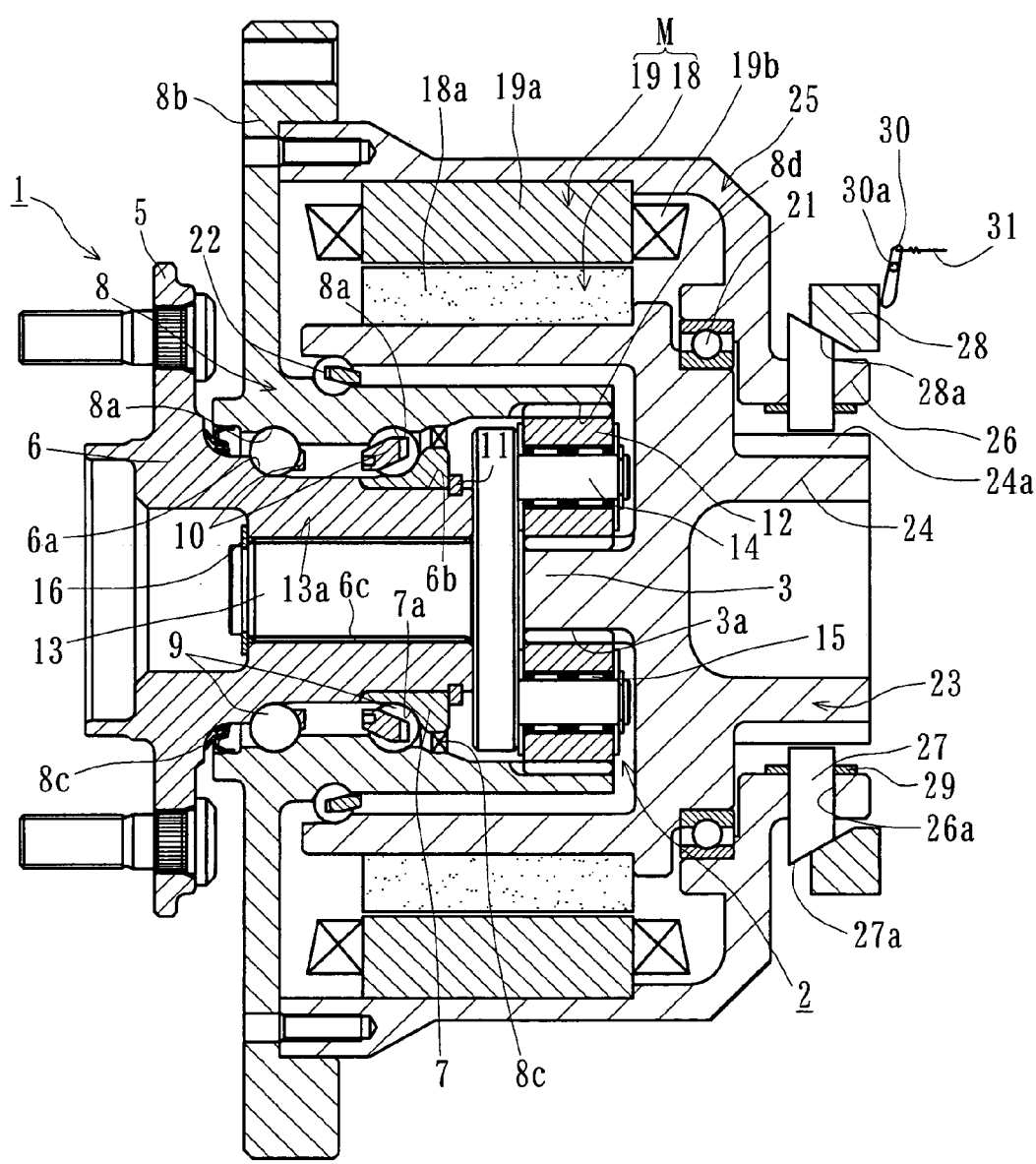
FIG. 3 is a longitudinal-section view of a second embodiment of a motor-driven wheel driving apparatus.
Figure 4:
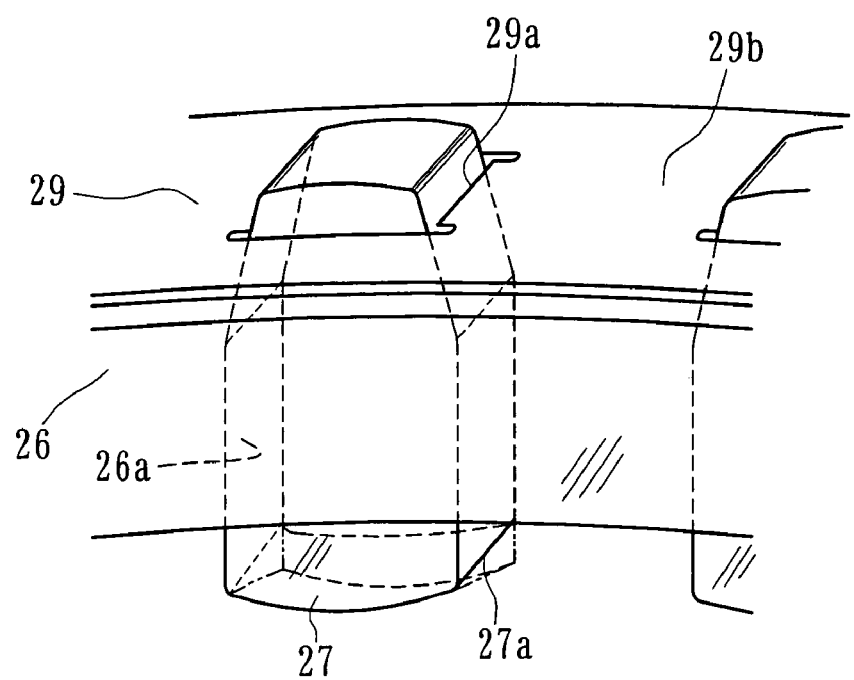
FIG. 4 is a partially enlarged perspective view of a portion of FIG. 3.

FIG. 3 is a longitudinal-section view of a second embodiment of a motor-driven wheel driving apparatus. FIG. 4 is a partially enlarged perspective view of a portion of FIG. 3. Since difference of this embodiment from the first embodiment (FIG. 1) only resides in the structure of the driving section, the same numerals are used as those used in the first embodiment to designate the same structural elements and thus detail description of them will be omitted.

The rotation member 23 is formed with a cylindrical portion 24 extending toward the inboard side. The cylindrical portion 24 includes a plurality of recesses 24a formed on its outer circumferential surface. The plurality of recesses 24a is arranged equidistantly along the outer circumferential surface. The stator housing 25 is formed, at its inboard side, with a cylindrical portion 26 arranged opposite to the cylindrical portion 24. The cylindrical portion 26 is also formed with a plurality of through apertures 26a corresponding to the recesses 24a. Each through aperture 26a contains an intermediate member 27. The intermediate member 27 has a substantially rectangular parallelepiped configuration with a steeple tip. An end surface 27a of the intermediate member 27 is tapered. The tapered surface 27a is adapted to be in sliding contacted with a tapered surface 28a of the cylindrical member 28. A tip end of the intermediate member 27 is received within a pocket 29a of an annular spring member 29.

In FIG. 3, an actuator 30 is arranged near the cylindrical member 28 and is swingably supported around a fulcrum 30a. One end of the actuator 30 contacts an end surface of the cylindrical member 28. The other end of the actuator 30 is connected to a brake wire 31. Actuation of the brake wire 31 causes the actuator 30 to be swung around the fulcrum 30a to displace the cylindrical member 28 axially (toward left side in FIG. 3). This displacement of the cylindrical member 28 causes all the intermediate member 27 to be moved radially inward. Thus, the tip end of each intermediate member 27 engages each recess 24a of the rotation member 23. As a result, the rotation member 23 and the stator housing 25 are united via the intermediate member 27. Thus, the rotation member 23 is secured to the stator housing 25.

Each pocket 28a of the annular spring member 29 is expanded in accordance with movement of the intermediate member 27. Thus, a column portion 29b between pockets 29a is elastically deformed (see FIG. 4). Each intermediate member 27 is moved radially outward and returned to its initial position by restoring the force of the elastically deformed column portion 29b. Accordingly, engagement between the recesses 24a of the rotation member 23 and the intermediate member 27 is released. Thus, the connection between the rotation member 23 and the stator housing 25 is also released.

As described above, the intermediate members 27 can be stably held by the through apertures 26a of the stator housing 25 and the annular spring member 29. The intermediate member 27 can be smoothly returned to their initial positions by the elastic force of the spring member 29. This generates a stable and reliable braking action. Accordingly, it is possible to reduce the number of parts by combining the rotation member 23, forming the electric motor "M", and the parking brake. Accordingly, this generates a braking action by the parking brake prior to reduction of the vehicle speed by the planetary reduction gear 2. Thus, it is possible to provide a braking apparatus with a light weight and compact size. In addition, it is possible to further reduce the weight and size of the braking section since the apparatus of this embodiment generates a larger braking force as compared with a parking brake of the prior art.

Figure 5:
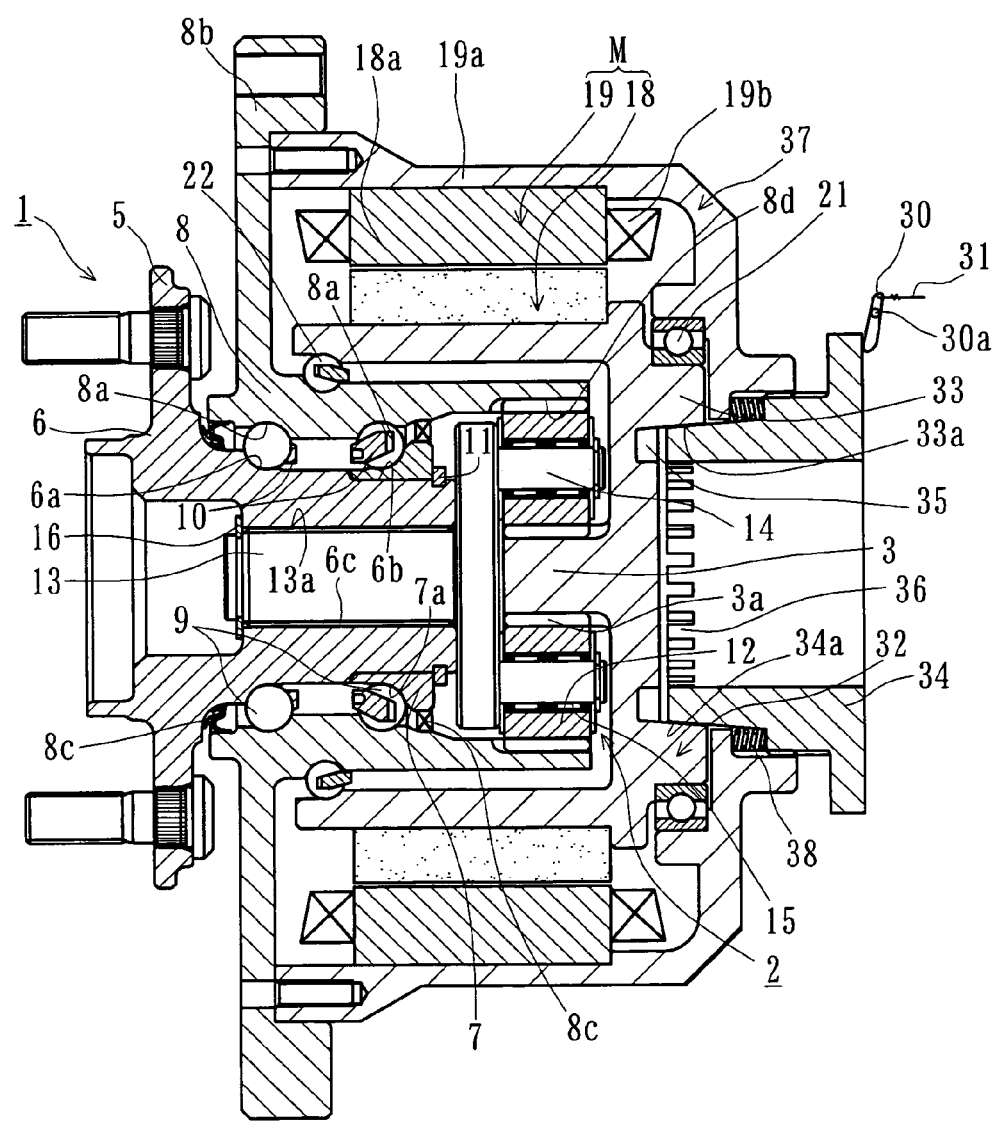
FIG. 5 is a longitudinal-section view of a third embodiment of a motor-driven wheel driving apparatus.

FIG. 5 is a longitudinal-section view of a third embodiment of a motor-driven wheel driving apparatus. This third embodiment is different from the second embodiment (FIG. 3) only in the structure of the braking section. Thus, the same numerals are used as those used in the previous embodiments to designate the same structural elements.

The rotation member 32 is formed with a cylindrical portion 33 extending toward the inboard side. The cylindrical portion 33 is formed with a tapered inner circumferential surface 33a. A ring shaped intermediate member 34 is arranged opposite to the rotation member 32. A tapered surface 34a, corresponding to the tapered surface 33a, is formed on the outer circumferential surface of the intermediate members 34. The rotation member 32 is formed with recesses 35 on its side surface at its inboard side. The recesses 35 are adapted to be engaged by projecting portions 36 that are formed on the end of the intermediate portion 34. In addition, the intermediate member 34 is arranged opposite to the stator housing 37 via elastic members 38. Also, the intermediate member 34 is arranged so that it cannot rotate but can axially slide relative to the stator housing 37, via a serration.

An actuator 30 is arranged near the intermediate member 34 and is swingably supported around a fulcrum 30a. One end of the actuator 30 contacts an end surface of the intermediate member 34. The other end of the actuator 30 is connected to a brake wire 31. Actuation of the brake wire 31 causes the actuator 30 to be swung around the fulcrum 30a to displace the intermediate member 34 axially (toward left side in FIG. 5). This displacement of the intermediate member 34 causes the tapered surfaces 34a of the intermediate member 34 to contact with the tapered surface 33a of the rotation member 32. Finally, the projecting portions 36 of the intermediate member 34 engage with the recessed portion 35 of the rotation member 32. As the result, the rotation member 32 and the stator housing 37 are united, via the intermediate member 34. Thus, the rotation member 32 is secured to the stator housing 37. When actuating the brake wire 31 to release the brake, the intermediate member 34 is axially moved toward the right and is returned to its initial position by the restoring force of the elastic members 38. Accordingly, engagement between the recesses 35 of the rotation member 32 and projections 36 of the intermediate member 34 is released. Thus, the connection between the rotation member 32 and the stator housing 37 is also released.

As described above, since the intermediate member 34 can be engaged and disengaged relative to the rotation member 32, via slippage engagement and projection/recess engagement, it is possible to effect the braking action while the rotation member 32 is not perfectly stopped. Also, it is possible to generate a stable and reliable braking action by the projection/recess engagement. Accordingly, it is possible to reduce the number of parts and the manufacturing cost by combining the rotation member 23, forming part of the electric motor "M", and the parking brake.

Figure 6:
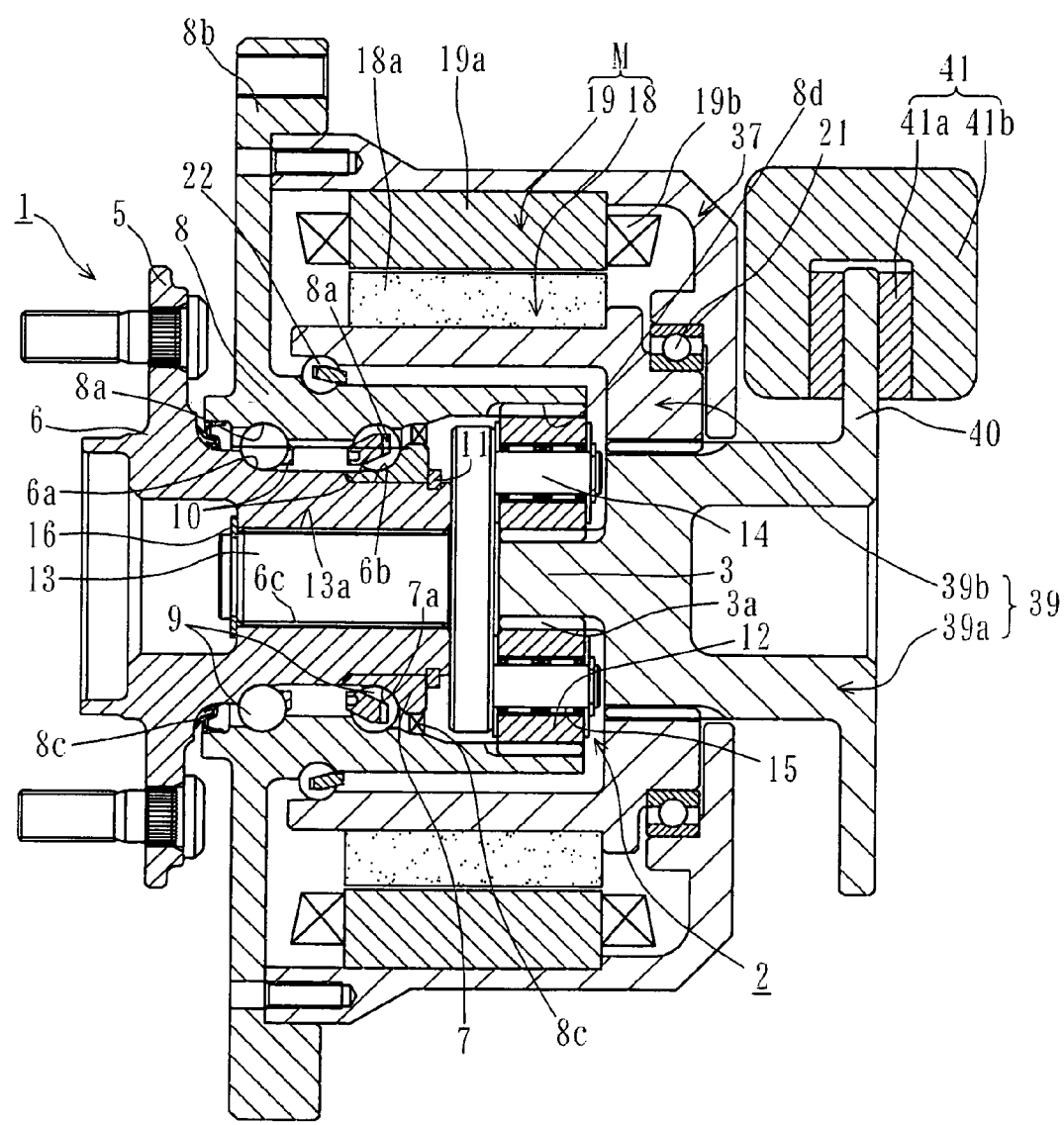
FIG. 6 is a longitudinal-section view of a fourth embodiment of a motor-driven wheel driving apparatus.

FIG. 6 is a longitudinal-section view of a fourth embodiment of a motor-driven wheel driving apparatus. The fourth embodiment is different from the previous embodiments (FIG. 3 and FIG. 5) only in the structure of the braking section. Thus, the same numerals are used as those used in the previous embodiments to designate the same structural elements.

The rotation member 39 comprises a base portion 39a, formed as a hat-like configuration, and a cylindrical portion 39b adapted to be fitted onto the base portion 39a in a torque transmitting manner, via a serration. The rotor portion 18, forming part of the electric motor "M", is secured on the outer circumferential surface of the cylindrical portion 39b. The base portion 39a is integrally formed with a brake rotor 40 on its inboard end. A disc brake 41 is associated with the brake rotor 40. The disc brake 41 comprises brake pads 41a for sandwiching the brake rotor 40 and a brake caliper 41b to urge the brake pads 41a against the brake rotor 40, via an actuator (not shown).

According to this embodiment, since the brake rotor 40 is integrally formed with the rotation member 39, forming a part of the electric motor "M", it is possible to reduce the manufacturing cost due to common use of structural parts. In addition, since the braking action can be effected by the disc brake 41 prior to speed reduction effected by the planetary reduction gear 2, it is possible to provide a light and compact disc brake. The disc brake 41 also has a parking brake function.

Figure 7:
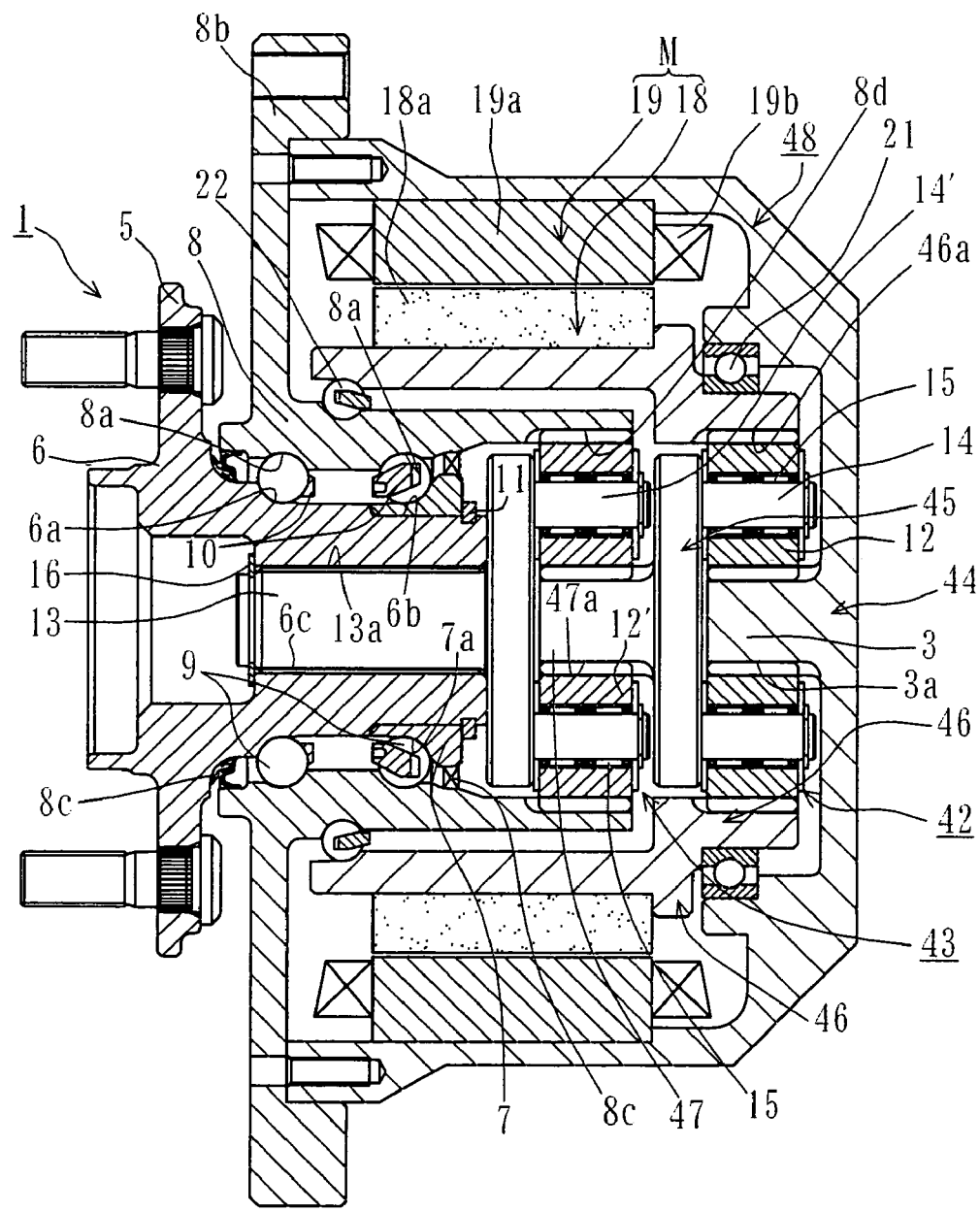
FIG. 7 is a fifth embodiment of a motor-driven wheel driving apparatus.
Figure 8:
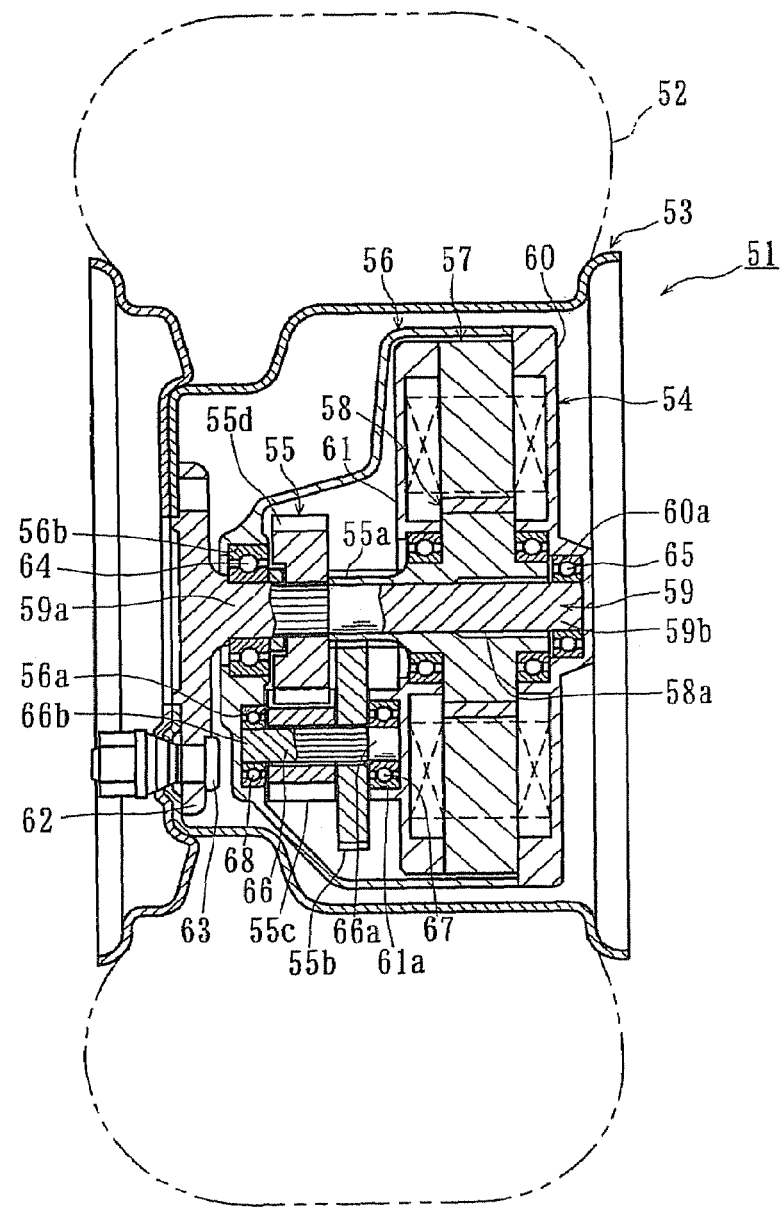
FIG. 8 is a longitudinal-section view of a prior art motor-driven wheel driving apparatus.

FIG. 7 is a longitudinal-section view of a fifth embodiment of a motor-driven wheel driving apparatus. This fifth embodiment is different from the first embodiments (FIG. 1) only in the structure of the planetary reduction gear. Thus, the same numerals are used as those used in the first embodiment to designate the same structural elements.

This embodiment comprises the wheel bearing 1 and two planetary reduction gears 42 and 43 mounted on the wheel bearing 1. The first reduction gear 42 includes the sun gear (stationary element) 3, four (4) planetary gears (planetary elements) effecting planetary motion around the sun gear 3, and carrier pins (output elements) 14. The carrier pins 14 rotatably support the planetary gears 12, via rolling bearings 15, relative to the first connecting shaft 45. A plurality of the carrier pins 14 projects from an outer circumferential portion of the first connecting shaft 45. The inner circumferential surface, at the inboard side of the rotation member (input element) 46, is formed with internal teeth 46a. The teeth 46a mesh with the planetary gears 12 to form a solar type of planetary reduction gear 42.

The second planetary reduction gear 43 comprises a sun gear (input element) 47 integrally formed with the first connecting shaft 45, four (4) planetary gears (planetary elements) 12' effecting planetary motion around the sun gear 47, and carrier pins (output elements) 14'. The carrier pins 14' rotatably support the planetary gears 12' relative to the second connecting shaft 13, via the rolling bearings 15. The inner circumferential surface, at the inboard side of the outer member (stationary element), is formed with internal teeth 8d to mesh with the planetary gears 12'.

The rotation member 46 includes the integrated rotor portion 18. The rotation member 46 is rotated by supplying electric energy to the electric motor "M". The rotation of the rotation member 46 is transmitted, with speed reduction, to the first connecting shaft 45, via the planetary gears 12. The rotation of the first connecting shaft 45 is transmitted to the planetary gear 12', via the sun gear 47 integrated with the first connecting shaft 45. In turn, the rotation is transmitted to the second connecting shaft 13 via the revolution of the planetary gear 12' (i.e. carrier pin 14'). Finally, the rotation is transmitted to the wheel hub 6 with a speed reduction via the serration 13a.

The speed reduction ratio of the first and second planetary gears 42 and 43 can be appropriately adjusted by changing the tooth ratio of the internal teeth 46a of the rotation member and the internal teeth 8d of the outer member 8. For example, the reduction ratio, in a range of 3:1 to 9:1, can be set when the planetary reduction gear is applied to the motor-driven wheel driving apparatus of electric vehicle. Whole speed reduction ratio can be determined by the product of the reduction ratio "m", of the first planetary reduction gear 42, and the reduction ratio "n", of the second planetary gear 43, and thus expressed as "m×n". Accordingly, since a very large reduction ratio can be obtained within a small space, it is possible to substantially reduce the weight and size of the electric motor "M".

Similarly to the previous embodiments, according to this embodiment, since the planetary gear 12', forming the second planetary reduction gear 43, is assembled into the inboard side end of the outer member 8, forming the wheel bearing 1, it is possible to assure a sufficient space for the bearing portion and thus to easily assemble the second planetary reduction gear 43. In addition, since the first and second planetary reduction gears 42 and 43 can equally support the moment load, via the double row bearings, it is possible to suppress the application of the offset load to the planetary gears 12 and 12' and the sun gears 3 and 47. It is also possible to reduce the axial size of the apparatus since the electric motor "M" is separably united to the body mounting flange 8b of the outer member 8 via the stator housing 44. Furthermore, since the driving section 48 can be contained within a knuckle (not shown), it is possible to protect the electric motor "M" from external force such as flying stones.

The motor-driven wheel driving apparatus can be applied to various kinds of vehicles such as 4-wheeled vehicles, motorcycles, golf carts, 2 or 4 wheeled carts for aged or physically handicapped persons, handy carts used in construction or transport fields and others powered by fuel cells or batteries.

The present invention has been described with reference to the preferred embodiment. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A motor-driven wheel driving apparatus comprising:
a wheel bearing, a planetary reduction gear, a driving section having an electric motor for driving the planetary reduction gear and a rotation member;
the wheel bearing including a wheel hub formed with a wheel mounting flange on one end, an inner ring press-fit on a cylindrical portion of the wheel hub, said inner ring formed with at least one double row inner raceway surfaces on an outer circumferential surface, an outer member formed with double row outer raceway surfaces on an inner circumferential surface opposite to the inner raceway surfaces, and double row rolling elements rollably arranged between the inner and outer raceway surfaces;
the planetary reduction gear including an input element mounted on the rotation member, a stationary element mounted on the inner circumferential surface of the outer member, a plurality of planetary elements arranged between the stationary element and the input element, and an output element for rotatably supporting the planetary elements relative to a connecting shaft;
the driving section forming the electric motor including a stator housing mounted on the outer member, a stator portion contained within the stator housing, and a rotor portion secured on the rotation member and arranged oppositely to the stator portion via a predetermined air gap;
the connecting shaft removably and torque-transmittably connected to the wheel hub, said connecting shaft adapted to drive a wheel by transmitting the rotation of the electric motor to the wheel hub via the planetary reduction gear;
a braking apparatus is directly associated with the rotation member for terminating rotation of said rotation member.

2. The motor-driven wheel driving apparatus of claim 1 wherein the planetary reduction gear comprises a sun gear mounted on the rotation member, a plurality of planetary gears meshing both with external teeth of the sun gear and with internal teeth formed on the inner circumferential surface of the outer member, and a carrier pin projecting from the outer circumferential portion of the connecting shaft to rotatably support the planetary gears.

3. The motor-driven wheel driving apparatus of claim 1 wherein the stator housing is separably fastened to the outer member.

4. The motor-driven wheel driving apparatus of claim 1 wherein the braking apparatus is a parking brake.

5. The motor-driven wheel driving apparatus of claim 4 wherein the parking brake comprises an intermediate member held on the stator housing, and an actuator for engaging and disengaging the intermediate member with the rotation member by displacing the intermediate member.

6. The motor-driven wheel driving apparatus of claim 5 wherein a plurality of recesses are formed on the rotation member, the stator housing is formed with a plurality of through apertures corresponding to the recesses, the intermediate member, having a tapered surface, is contained in the through passage, and the intermediate member can be adapted to be engaged and disengaged with the recess while being displaced by a cylindrical member engaging the tapered surface.

7. The motor-driven wheel driving apparatus of claim 5 wherein a plurality of recesses and tapered surfaces are formed on the rotation member, the intermediate member is formed with projecting portions and tapered surfaces adapted to be engaged, respectively, with the recesses and the tapered surfaces of the rotation member, and the intermediate member is held so as to be able to transmit a torque to the stator housing and to be axially displaced.

8. The motor-driven wheel driving apparatus of claim 1 wherein the planetary reduction gear has first and second planetary gears connected to each other via the connecting shaft, and the power of the electric motor can be adapted to be transmitted to the wheel hub by reducing the rotation of the electric motor to two steps via the first and second planetary reduction gears.

9. The motor-driven wheel driving apparatus of claim 8 wherein the first planetary reduction gear comprises a first sun gear mounted on the stator housing, a first plurality of planetary gears meshing both with external teeth of the first sun gear and with internal teeth formed on the inner circumferential surface of the rotation member, and carrier pins for rotatably supporting the first plurality of planetary gears relative to a first connecting shaft; the second planetary reduction gear comprises a second sun gear mounted on the first connecting shaft, a second plurality of planetary gears meshing both with external teeth of the second sun gear and with internal teeth formed on the inner circumferential surface of the outer member, and carrier pins for rotatably supporting the second plurality of planetary gears relative to a second connecting shaft; and the second connecting shaft is connected to the wheel hub.

* * * * *